(12) United States Patent
Stender et al.

(10) Patent No.: US 8,778,211 B2
(45) Date of Patent: Jul. 15, 2014

(54) GST CMP SLURRIES

(75) Inventors: Matthias Stender, Fox Point, WI (US); Glenn Whitener, Batavia, IL (US); Chul Woo Nam, Hawsung-Si (KR)

(73) Assignee: Cabot Microelectronics Corporation, Aurora, IL (US)

( * ) Notice: Subject to any disclaimer, the term of this patent is extended or adjusted under 35 U.S.C. 154(b) by 5 days.

(21) Appl. No.: 13/551,423

(22) Filed: Jul. 17, 2012

(65) Prior Publication Data

US 2014/0024216 A1    Jan. 23, 2014

(51) Int. Cl.
| | |
|---|---|
| C09K 13/00 | (2006.01) |
| C09K 13/04 | (2006.01) |
| C03C 15/00 | (2006.01) |
| C03C 25/68 | (2006.01) |
| H01L 21/302 | (2006.01) |
| H01L 21/461 | (2006.01) |

(52) U.S. Cl.
USPC ............... 216/88; 216/89; 438/689; 438/690; 438/691; 438/692; 438/693; 252/79.1; 252/79.2

(58) Field of Classification Search
None
See application file for complete search history.

(56) References Cited

U.S. PATENT DOCUMENTS

| | | | |
|---|---|---|---|
| 6,744,088 B1 | 6/2004 | Dennison | |
| 7,250,369 B1 | 7/2007 | Uchida et al. | |
| 7,367,870 B2 | 5/2008 | Kurata et al. | |
| 2003/0102457 A1 | 6/2003 | Miller | |
| 2006/0000151 A1 | 1/2006 | Kelley et al. | |
| 2007/0221145 A1* | 9/2007 | Forner et al. | 123/41.01 |
| 2009/0056231 A1* | 3/2009 | White et al. | 51/298 |
| 2009/0057661 A1 | 3/2009 | Siddiqui et al. | |
| 2009/0221145 A1* | 9/2009 | Inada et al. | 438/693 |
| 2009/0275188 A1 | 11/2009 | Park et al. | |
| 2010/0130013 A1* | 5/2010 | Liu et al. | 438/693 |

FOREIGN PATENT DOCUMENTS

| | | |
|---|---|---|
| CN | 1616572 | 5/2005 |
| CN | 1632023 | 6/2005 |
| DE | 142830 | 7/1980 |
| DE | 148914 | 6/1981 |
| EP | 1150341 | 10/2001 |
| JP | 59-196385 | 4/1983 |
| JP | 07-161669 | 6/1995 |
| SU | 1059033 | 12/1983 |
| WO | WO 2004/055916 | 7/2004 |

* cited by examiner

Primary Examiner — Nadine Norton
Assistant Examiner — Stephanie Duclair
(74) Attorney, Agent, or Firm — Thomas E Omholt; Robert J Ross; Steven D Weseman

(57) ABSTRACT

The present invention provides chemical-mechanical polishing (CMP) compositions suitable for polishing a substrate comprising a germanium-antimony-tellurium (GST) alloy. The CMP compositions of the present invention are aqueous slurries comprising a particulate abrasive, a water-soluble surface active agent, a complexing agent, and a corrosion inhibitor. The ionic character of the surface active material (e.g., cationic, anionic, or nonionic) is selected based on the zeta potential of the particulate abrasive. A CMP method for polishing a GST alloy-containing substrate utilizing the composition is also disclosed.

24 Claims, 1 Drawing Sheet

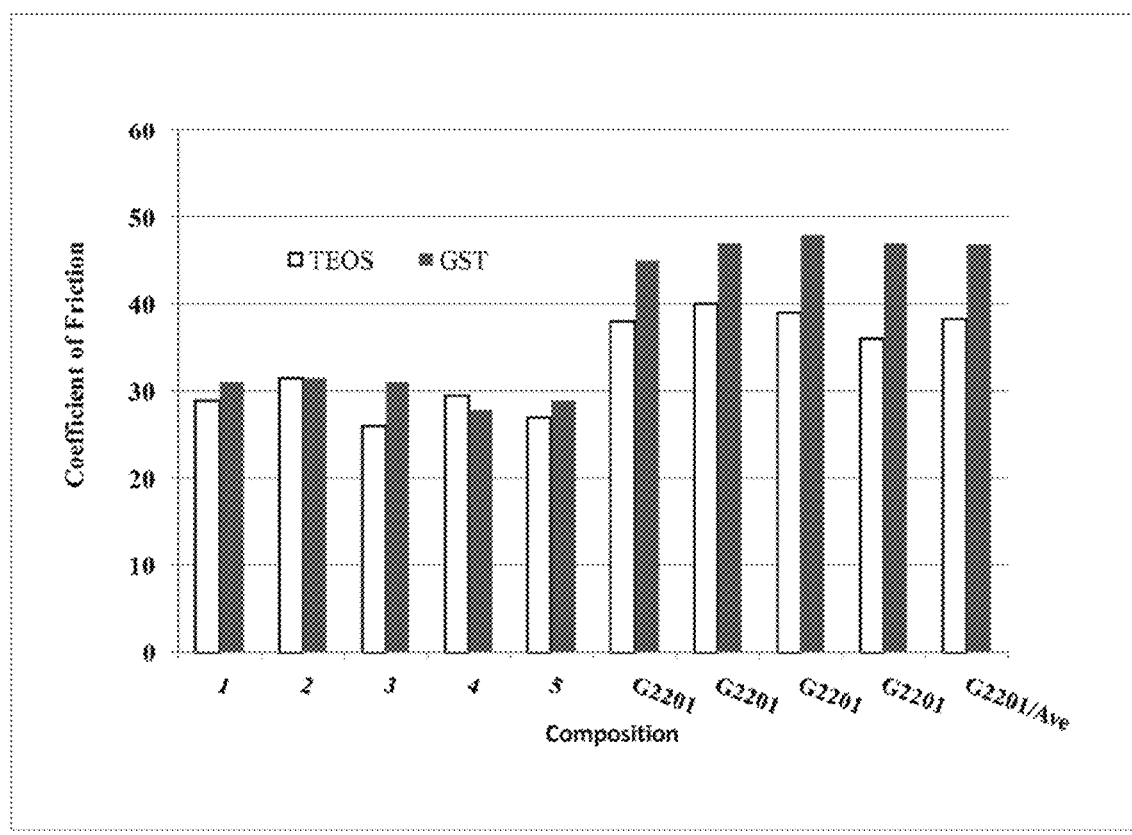

GST CMP SLURRIES

FIELD OF THE INVENTION

This invention relates to chemical-mechanical polishing (CMP) compositions and methods for polishing a phase change alloy. More particularly, this invention relates to CMP compositions and methods for polishing germanium-antimony-tellurium (GST) alloys.

BACKGROUND OF THE INVENTION

Typical solid state memory devices (dynamic random access memory (DRAM), static random access memory (SRAM), erasable programmable read only memory (EPROM), and electrically erasable programmable read only memory (EEPROM) employ micro-electronic circuit elements for each memory bit in memory applications. Since one or more electronic circuit elements are required for each memory bit, these devices consume considerable chip space to store information, limiting chip density. For typical non-volatile memory elements (like EEPROM i.e. "flash" memory), floating gate field effect transistors are employed as the data storage device. These devices hold a charge on the gate of the field effect transistor to store each memory bit and have limited re-programmability. They are also slow to program.

Phase Change Access Memory devices (also known as PRAM or Ovonic memory devices) use phase change materials (PCMs) that can be electrically switched between an insulating amorphous and conductive crystalline state for electronic memory application. Typical materials suited for these applications utilize various chalcogenide (Group VIB) and Group VB elements of the periodic table (e.g., Te, Po, and Sb) in combination with one or more of In, Ge, Ga, Sn, or Ag (sometimes referred to as a "phase change alloy"). Particularly useful phase change alloys are germanium (Ge)-antimony (Sb)-tellurium (Te) alloys (GST alloys), such as an alloy having the formula $Ge_2Sb_2Te_5$ (GST225). These materials can reversibly change physical states depending on heating/cooling rates, temperatures, and times.

Compositions and methods for chemical-mechanical polishing (CMP) the surface of a substrate are well known in the art. Polishing compositions (also known as polishing slurries, CMP slurries, and CMP compositions) for CMP of metal-containing surfaces of semiconductor substrates (e.g., integrated circuits) typically contain an oxidizing agent, various additive compounds, abrasives, and the like.

In conventional CMP techniques, a substrate carrier or polishing head is mounted on a carrier assembly and positioned in contact with a polishing pad in a CMP apparatus. The carrier assembly provides a controllable pressure to the substrate, urging the substrate against the polishing pad. The pad and carrier, with its attached substrate, are moved relative to one another. The relative movement of the pad and substrate serves to abrade the surface of the substrate to remove a portion of the material from the substrate surface, thereby polishing the substrate. The polishing of the substrate surface typically is further aided by the chemical activity of the polishing composition and/or the mechanical activity of an abrasive suspended in the polishing composition.

GST alloys having an increased amount of antimony and a decreased amount of tellurium relative to GST225 are increasingly being used as a phase-change alloy in electronic circuits. These antimony-rich GST alloys are "softer" relative to conventional GST alloys, because the lower tellurium content makes the GST alloy easier to oxidize and remove. Polishing these antimony-rich GST alloys with conventional CMP techniques results in an unacceptably high level of defects and distortions on the surface of the polished GST alloys. There is a significant need for CMP compositions and techniques having a GST removal rate lower than conventional CMP compositions that can be used to polish the "softer" antimony-rich GST alloys and limit surface defects.

Conventional CMP compositions and techniques for removal of GST alloys are generally designed to remove GST layers while avoiding or minimizing the removal of dielectric material such as silicon nitride ($Si_3N_4$). The ratio of the removal rates of a GST layer to the removal rate of a dielectric base layer is called the "selectivity" or "removal rate ratio" for removal of GST in relation to dielectric during CMP processing. Previously, it was believed that the removal rate of the GST layer must greatly exceed the removal rate of the dielectric layer (e.g. high GST selectivity) so that polishing effectively stops when elevated portions of the dielectric are exposed. In some emerging electrical circuit designs, however, there is a need for a CMP application to remove both GST alloys and silicon nitride. Known polishing compositions and methods do not provide the ability to remove GST alloys and silicon nitride at desired removal rates and removal rate ratios.

The compositions and methods of the present invention address the challenges associated with polishing softer GST alloys and in some embodiments, the need for removal of silicon nitride along with GST.

BRIEF SUMMARY OF THE INVENTION

The present invention provides an aqueous chemical-mechanical polishing (CMP) composition suitable for polishing GST-containing materials, particularly softer Te-deficient GST materials (relative to GST225). A CMP composition of the invention comprises, consists essentially of, or consists of an aqueous carrier containing a particulate abrasive; a water soluble surface active material (e.g., at least one cationic, anionic, and/or nonionic polymer or surfactant), a corrosion inhibitor (e.g., an amino acid); and a complexing agent. In one aspect the present invention provides an aqueous CMP composition including (a) a particulate abrasive selected from the group consisting of a colloidal silica abrasive and ceria abrasive; (b) a water-soluble surface active polymer and/or surfactant; (c) a corrosion inhibitor (e.g., an amino acid such as lysine or glycine); and (d) a complexing agent (e.g., a phosphonic acid, such as 1-hydroxyethylidene-1,1,-diphosphonic acid). The surface active material is selected based on the zeta potential of the particulate abrasive, such that when the abrasive has a positive zeta potential, the surface active material comprises a cationic material, and when the particulate abrasive has a negative zeta potential, the surface active material comprises an anionic material, a nonionic material, or a combination thereof. For example, the CMP composition can comprise an aqueous carrier containing, at point-of-use (a) about 0.01 to about 10 percent by weight (wt %) of a particulate abrasive selected from the group consisting of a colloidal silica abrasive and ceria abrasive; (b) about 10 to about 10000 ppm of a water soluble surface active material; (c) about 0.1 to about 2 wt % of a corrosion inhibitor; and (d) about 10 to about 10000 ppm of a complexing agent.

In some preferred embodiments the particulate abrasive comprises ceria or an aminosilane surface-treated colloidal silica having a positive zeta potential, and the water soluble surface active material comprises a poly(methacryloyloxyethyl trimethylammonium) halide. In other preferred embodiments, the particulate abrasive comprises colloidal silica having a negative zeta potential, and the water soluble surface active material comprises a poly(acrylic acid), a polyacrylamide, or a combination thereof.

The present invention also provides a method of polishing a surface of a substrate comprising a GST alloy (e.g., a Te-deficient GST) with a CMP composition of the invention. The method comprises the steps of contacting a surface of a GST-containing substrate with a polishing pad and an aqueous CMP composition, and causing relative motion between the polishing pad and the substrate, while maintaining a portion of the CMP composition in contact with the surface between the pad and the substrate. The relative motion is maintained for a period of time sufficient to abrade at least a portion of the GST alloy from the substrate. In some embodiments, the surface also comprises silicon nitride, which preferably is removed from the surface at a rate of at least about 100 Å/min.

BRIEF DESCRIPTION OF THE DRAWINGS

FIG. 1 shows a plot of coefficients of friction for selected CMP compositions used to polish GST and TEOS layers.

DETAILED DESCRIPTION OF THE INVENTION

The present invention provides an aqueous CMP composition useful for polishing a surface of a substrate containing or comprising a GST alloy, such as an alloy having the formula $Ge_2Sb_2Te_5$ (GST225), and particularly for softer GST alloys that are more Sb-rich and/or Te-deficient than GST225.

The aqueous CMP compositions and methods of the invention provide for even removal of a GST layer with reduced defects relative to conventional CMP compositions when utilized with softer (relative to GST225) Te-deficient GST alloys. In some aspects, the compositions and methods of the invention also provide for removal of GST and silicon nitride, preferably at a silicon nitride removal rate of at least about 100 Å/min and a GST removal rate in the range of about 100 to 1000 Å/min. The CMP compositions of the invention comprise, consist essentially of, or consist of an aqueous carrier containing a particulate abrasive material, a water-soluble surface active material (i.e., polymer and/or surfactant), a corrosion inhibitor, and a complexing agent.

The aqueous carrier can be any aqueous solvent, e.g., water, aqueous methanol, aqueous ethanol, a combination thereof, and the like. Preferably, the aqueous carrier comprises, consists essentially of, or consists of deionized water.

The particulate abrasive materials useful in the CMP compositions of the invention include ceria, which has a positive zeta potential, and colloidal silica, which has a negative zeta potential in its native state, but which can be surface-modified by treatment with an aminosilane to have a positive zeta potential. A preferred type of ceria for use in the CMP composition of the invention is wet-processed ceria, such as ceria commercially available from Rhodia Group, Inc. under the tradename RHODIA HC60. As used herein and in the appended claims, the term "colloidal silica" refers to silicon dioxide that has been prepared by condensation polymerization of $Si(OH)_4$. The precursor $Si(OH)_4$ can be obtained, for example, by hydrolysis of high purity alkoxysilanes, or by acidification of aqueous silicate solutions. Such colloidal silica can be prepared, for example, in accordance with U.S. Pat. No. 5,230,833 or can be obtained as various commercially available products, such as the FUSO PL-1, PL-2, and PL-7 products, and the NALCO 1050, 2327, and 2329 products, as well as other similar products available from DuPont, Bayer, Applied Research, Nissan Chemical, and Clariant.

One preferred type of colloidal silica for use in the CMP composition of the invention is untreated (i.e., "native") colloidal silica having a negative zeta potential, such as colloidal silica commercially available from Fuso Chemical Co., Inc. under the tradenames FUSO PL-7 and FUSO PL-2. In other preferred embodiments, the surface of the colloidal silica particles is treated with an aminosilane such as bis(trimethoxysilyl propyl)amine, e.g., SILQUEST A1170 (Crompton OSi Specialties) or a similar reactive aminosilane to adjust the zeta potential from negative to positive, by bonding basic amino groups to the surface of the silica particles and thereby neutralize acidic SiOH groups on the particle surface. Preferably, the surface-treated colloidal silica is treated with sufficient aminosilane to provide a highly positive zeta potential in the range of about 5-50, if a cationic polymer or surfactant is to be included in the CMP composition.

Preferably, the abrasive material is present in the CMP composition at a concentration in the range of about 0.01 to about 10 percent by weight (wt %). In some preferred embodiments, the abrasive material is present at a concentration in the range of about 0.05 to about 2 wt %, more preferably about 0.1 to about 1 wt %, at point of use. As used herein, the phrase "point of use" refers to the concentration of a given component that will be used directly in a CMP process, without further dilution. The point of use concentration generally is achieved by dilution of a more concentrated composition (e.g., just before or within a few days prior to use).

Colloidal silica abrasive particles preferably have a mean particle size in the range of about 10 nm to about 200 nm, e.g., about 50 nm to about 100 nm (e.g., as determined by laser light scattering techniques, which are well known in the art). Ceria abrasive particles preferably have a mean particle size in the range of about 10 nm to about 200 nm, e.g., about 50 nm to about 100 nm.

The water-soluble surface active materials useful in the CMP compositions of the invention are selected based on the zeta potential of the particulate abrasive included in the composition. Cationic polymers and/or surfactants are used with abrasives having a positive zeta potential, such as ceria and aminosilane-treated colloidal silica. Optionally, the cationic material can be combined with a nonionic polymer or surfactant, if desired. Anionic and/or nonionic surface active materials are utilized when the abrasive has a negative zeta potential, such as native colloidal silica.

Cationic polymers useful in the compositions and methods of the present invention include homopolymers of cationic monomers (e.g., a poly(diallyldimethylammonium halide, a methacryloyloxyethyltrimethylammonium halide, and the like), as well as copolymers of cationic and nonionic monomers (e.g., poly(acrylamide-co-diallyldimethylammonium chloride)). A preferred cationic polymer for use in the CMP compositions of the invention is a poly(methacryloyloxyethyl trimethylammonium) halide (e.g., chloride), such as the polymer commercially available from Alco Chemical Inc. under the tradename ALCO 4773. Other suitable cationic materials include cationic surfactants, such as hexadecyltrimethylammonium bromide (also known as cetyltrimethylammonium bromide, CTAB), 1-decyltrimethylammonim chloride (DPC), and the like. Preferably, the cationic material is a cationic polymer. Cationic polymers utilized in the compositions and methods of the present invention preferably have an average molecular weight in the range of about 10,000 to 1,000,000 Daltons, for example about 100,000 for poly(diallyldimethylammonim chloride) and about 250,000 for poly (acrylamide-co-diallyldimethylammonium chloride).

Anionic polymers useful in the compositions and methods of the present invention include, for example, homopolymers such as polyacrylic acid (PAA), polymethacrylic acid (PMAA), polymaleic acid (PMA), poly(2-acrylamido-2-methylpropanesulfonate (polyAMPS), and the like, as well as copolymers of anionic and nonionic monomers, such as poly (acrylic acid-co-methacrylic acid), poly(acrylic acid-co-2-acrylamido-2-methyl-propanesulfonic acid), and the like. The anionic polymers can be utilized in the acidic form or as salts (e.g., sodium salts). The actual ionic character of the anionic polymer (i.e., fully ionized or partially ionized) will depend upon the pH of the CMP composition, as is well known in the art. Preferably, anionic polymers utilized in the compositions and methods of the present invention have an average molecular weight of about 100,000 Daltons or less, for example, about 10,000 Daltons or less, or in the range of about 1,000 to 10,000 Daltons.

Nonionic polymers useful in the compositions and methods of the present invention include, for example, polyacrylamide (PAM) homopolymers, and copolymers of acrylamide with one or more other nonionic monomer such as methacrylamide, N-vinylpyrrolidone, and the like. Preferably, nonionic polymers utilized in the compositions and methods of the present invention have an average molecular weight of about 100,000 Daltons or less, for example, about 10,000 Daltons or less, or in the range of about 1,000 to 10,000 Daltons.

In some preferred embodiments the water-soluble surface active material (e.g., polymer or surfactant) is present in the composition at a concentration in the range of about 10 to about 10,000 parts-per-million (ppm), e.g., about 100 to about 1,000 ppm.

The abrasive desirably is suspended in the CMP composition, more specifically in the aqueous component of the CMP composition, and is colloidally stable. The term colloid refers to the suspension of abrasive particles in the liquid carrier. Colloidal stability refers to the maintenance of that suspension over time.

In some embodiments, a ceria abrasive or an aminosilane-treated colloidal silica abrasive is used in conjunction with a cationic polymer in the CMP composition of the present invention. Ceria and aminosilane-treated colloidal silica have positive zeta potentials, which complement the zeta potential of a cationic polymer, and allow both components to exist within the same composition without precipitation of components. Inclusion of a cationic polymer such as ALCO 4773 in the CMP composition reduces surface defects on the GST alloy being polished, relative to CMP compositions lacking a polymer. It is believed that the zeta positive polymer forms a film on the zeta-negative GST alloy film, which reduces the GST removal rate and also lowers friction during the polishing process. This protective film and lowered friction consequently reduces defects and deformities on the surface of the polished GST alloy.

In other embodiments, the abrasive material component of the CMP composition comprises native colloidal silica having a negative zeta potential, preferably in conjunction with an anionic polymer and/or a nonionic polymer in the CMP composition of the present invention. PAA and PAM, for example, advantageously form colloidally stable slurries with colloidal silica, due to the negative zeta potential of colloidal silica. Some non-ionic polymers such as low molecular weight polyethylene glycols, polyvinylpyrrolidone or polyvinylalcohol typically do not form colloidally stable slurries in the CMP composition of the present invention, at least when utilized on their own. Anionic polymers such as PAA or a nonionic polymers such as PAM reduce surface defects on the GST alloy being polished, and reduce the GST alloy removal rate relative to CMP compositions lacking these polymers.

Ceria and colloidal silica remove both silicon nitride and GST alloy in a CMP process of the invention. Due to the different chemical properties and Zeta potentials of these two abrasives, however, the choice of polymer type (cationic, anionic, or nonionic) differs depending on which abrasive is selected, as discussed above.

The CMP compositions of the invention also comprise at least one corrosion inhibitor, preferably an amino acid corrosion inhibitor. Examples of suitable amino acid corrosion inhibitors include lysine and glycine. Preferably, the corrosion inhibitor is lysine. The concentration of corrosion inhibitor used in the CMP compositions of the invention can be in the range of about 0.01 wt % to about 2 wt %, e.g., about 0.1 to about 1 wt %.

The CMP compositions of the invention also comprise at least one complexing agent. Complexing agents are believed to reduce residues that occur on the surface of the material being polished during a CMP process. Examples of suitable complexing agents include hydroxyl-substituted organophosphates, carboxylic acids such as malonic, tartaric or citric acid, and dithiocarbamates such as diethyl dithiocarbamate. Preferably, the complexing agent is a hydroxyl-substituted organophosphate such as 1-hyrdroxyethylidene-1,1,-diphosphonic acid, commonly known by its tradename DEQUEST 2010. The levels of complexing agent used in the composition of the invention can range from about 10 to about 10000 ppm, e.g., about 100 to about 1000 ppm.

In some embodiments, other additive materials conventionally used in CMP compositions may be included in the CMP compositions of the invention. For example, the CMP compositions of the current invention can contain a biocide. A preferred biocide is mixture of chloromethyl isothiazolinone (CMIT) and methylisothiazolinone (MIT) available commercially from Rohm and Haas Company under the tradename KATHON. If present, selection of the level of biocide used in the compositions and methods of the invention is selected based on the choice of biocide, and other parameters within the knowledge base of one of ordinary skill in the CMP formulation art. For example, a typical biocide levels for KATHON biocide is in the 1 to 50 ppm level (e.g., about 15 ppm).

The CMP compositions of the current invention can also contain a sulfate salt such as potassium sulfate ($K_2SO_4$), disodium sulfate, or diammonium sulfate. Varying the presence and amount of salt in the composition of the invention alters the silicon nitride removal rate, as described in the examples below. If present, the salt (e.g., potassium sulfate) is used in the composition at a concentration in range of about 10 to about 10,000 ppm, preferably about 100 to about 1,000 ppm.

The CMP compositions of the invention preferably have a pH in the range of about 2 to about 6. For CMP compositions comprising ceria, the pH of the composition is preferably about 4 to about 5, most preferably about 4.5. For CMP compositions comprising colloidal silica, the pH of the composition is preferably about 2 to about 3, most preferably about 2.3. The CMP compositions can optionally comprise one or more pH buffering materials, for example, ammonium acetate, disodium citrate, and the like. Many such pH buffering materials are well known in the art.

Preferably, the CMP compositions of the present invention are free of oxidizing agents. As used herein the phrase "free of oxidizing agents" means that the compositions include no more than trace contaminant amounts of oxidizing materials, e.g., in amounts that are insufficient to affect any significant metal oxidation during CMP.

In some preferred embodiments, the composition includes less than about 0.5 percent by weight of organic materials.

The CMP compositions of the invention can be prepared by any suitable technique, many of which are known to those skilled in the art. The CMP composition can be prepared in a batch or continuous process. Generally, the CMP composition can be prepared by combining the components thereof in any order. The term "component" as used herein includes individual ingredients (e.g., abrasives, complexing agents, polymers, and the like), as well as any combination of ingredients. For example, an abrasive can be dispersed in water, and the complexing agent can be added, and mixed by any method that is capable of incorporating the components into the CMP composition. The polymer, when present, can be added to the composition at any suitable time. The pH can be adjusted at any suitable time.

The CMP compositions of the present invention also can be provided as a concentrate, which is intended to be diluted with an appropriate amount of water prior to use. In such an embodiment, the CMP composition concentrate can include the various components dispersed or dissolved in aqueous solvent in amounts such that, upon dilution of the concentrate with an appropriate amount of aqueous solvent, each component of the polishing composition will be present in the CMP composition in an amount within the appropriate range for use.

The invention also provides a method of chemically-mechanically polishing a substrate that includes a GST alloy. The method comprises (i) contacting a surface of a substrate with a polishing pad and a CMP composition of the invention as described herein, and (ii) moving the polishing pad relative to the surface of the substrate with the polishing composition therebetween, thereby abrading at least a portion of the GST alloy from the substrate to polish the surface thereof.

The CMP methods of the present invention can be used to polish any suitable GST-containing substrate, and is especially useful for polishing substrates comprising a GST alloy and silicon nitride. In a preferred method, a GST alloy material is abraded, and the abrading continues once the polishing pad reaches the silicon nitride layer.

The CMP methods of the present invention are particularly suited for use in conjunction with a chemical-mechanical polishing apparatus. Typically, the CMP apparatus comprises a platen, which, when in use, is in motion and has a velocity that results from orbital, linear, and/or circular motion, a polishing pad in contact with the platen and moving with the platen when in motion, and a carrier that holds a substrate to be polished in contact with the pad and moving relative to the surface of the polishing pad. A CMP composition is typically pumped onto the polishing pad to aid in the polishing process. The polishing of the substrate is accomplished by the combined abrasive action of the moving polishing pad and the CMP composition of the invention present on the polishing pad, which abrades at least a portion of the surface of the substrate, and thereby polishes the surface.

A substrate can be planarized or polished with a CMP composition of the invention using any suitable polishing pad (e.g., polishing surface). Suitable polishing pads include, for example, woven and non-woven polishing pads. Moreover, suitable polishing pads can comprise any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof.

Desirably, the CMP apparatus further comprises an in situ polishing endpoint detection system, many of which are known in the art. Techniques for inspecting and monitoring the polishing process by analyzing light or other radiation reflected from a surface of the workpiece are known in the art. Such methods are described, for example, in U.S. Pat. No. 5,196,353 to Sandhu et al., U.S. Pat. No. 5,433,651 to Lustig et al., U.S. Pat. No. 5,949,927 to Tang, and U.S. Pat. No. 5,964,643 to Birang et al. Desirably, the inspection or monitoring of the progress of the polishing process with respect to a workpiece being polished enables the determination of the polishing end-point, i.e., the determination of when to terminate the polishing process with respect to a particular workpiece.

The invention also provides a CMP method for modulating the GST-to-silicon nitride removal rate ratio when polishing a suitable substrate. The modulating method includes polishing a GST substrate and a silicon nitride substrate under predetermined polishing conditions with a CMP composition of the invention, and determining the selectivity for the GST layer removal relative to silicon nitride removal achieved by this polishing. The GST removal rate is then decreased or increased by altering the type and amount of polymer present in the composition. The silicon nitride removal rate is decreased or increased by altering the amount of potassium sulfate present in the composition. The GST-to-silicon nitride removal rate ratio is decreased or increased by altering the polymer and potassium sulfate in the composition accordingly.

The non-limiting examples discussed below further illustrate certain aspects of the compositions and methods of the present invention.

Example 1

Some non-limiting examples of CMP compositions of the present invention are illustrated below, in Table 1. In the Table: "SAM" stands for surface active material; "CA" stands for complexing agent; "CI" stands for corrosion inhibitor; "A-CS" stands for colloidal silica treated with bis(trimethoxysilylpropyl)amine (commonly known by its tradename SILQUEST A-1170) by combining a 6 wt % silica slurry with about 650 ppm of SILQUEST A-1170—the treated silica had a positive zeta potential of about 35-40 mV; "Ceria" stands for wet-processed ceria; "CS" stands for a native colloidal silica; "D" stands for DEQUEST 2010; "L" stands for lysine; "CP" stands for the cationic polymer ALCO 4773; "CTAB" stands for cetyltrimethylammonium bromide; "PAA" stands for poly(acrylic acid) of about 2000 molecular weight (MW); PAM stands for polyacrylamide of about 10,000 MW. An asterisk "*" indicates the composition also included about 500 ppm of potassium sulfate. Concentrations in Table 1 are on a point of use basis.

TABLE 1

CMP Composition Formulations

| Comp. # | Components | | | | |
|---|---|---|---|---|---|
| | Abrasive | SAM | CA | CI | pH |
| 1 | A-CS, 0.15 wt % | CP, 500 ppm | D, 100 ppm | L, 0.5 wt % | 2.3 |

TABLE 1-continued

CMP Composition Formulations

| Comp. # | Abrasive | SAM | CA | CI | pH |
|---|---|---|---|---|---|
| 2 | A-CS, 0.15 wt % | CP, 500 ppm | none | none | 2.3 |
| 3 | A-CS, 0.15 wt % | CP, 500 ppm | none | L, 0.5 wt % | 2.3 |
| 4 | A-CS, 0.15 wt % | CTAB, 1000 ppm | none | none | 2.3 |
| 5 | A-CS, 0.15 wt % | CP, 500 ppm | D, 100 ppm | L, 0.5 wt % | 2.3 |
| 6 | A-CS, 0.15 wt % | CP, 3000 ppm | D, 100 ppm | L, 0.5 wt % | 2.3 |
| 7* | CS, 0.15 wt % | PAA, 500 ppm | D, 100 ppm | L, 0.5 wt % | 2.3 |
| 8* | CS, 0.15 wt % | PAM, 500 ppm | D, 100 ppm | L, 0.5 wt % | 2.3 |

Example 2

This example illustrates the performance of selected CMP compositions of the present invention for removal of GST from an antimony rich GST substrate. Compositions 1, 2, 3, 4, and 5 of Example 1 were utilized to polish antimony rich GST wafers. For comparison, wafers also were polished with a slurry designated as GST2201, which is similar to Composition 1, but lacking the cationic surface active agent (e.g., cationic polymer or surfactant). The GST2201 polishing was performed four times as a replicated control. Compositions 1 and 5 are also replicates of one another.

The antimony rich GST wafers were polished using the following polishing conditions: an APPLIED MATERIALS REFLEXION LK CMP device with an IC1010 polishing pad, platen speed of about 93 rpm, head speed of about 91 rpm, down pressure of about 1.0 psi, and a slurry flow rate of about 300 mL/minute.

FIG. 1 provides a bar graph of the coefficient of friction resulting from the polishing of antimony rich GST and TEOS wafers using Composition 1-5 and the control GST2201 (labeled G2201 in the graph). All of the Compositions 1-5 provided substantially similar results. All of these cationic-containing compositions resulted in improved (lower) coefficients of friction during polishing compared to the GST2201 control composition, which lacks the cationic material. Compositions 1-5 exhibited a coefficient of friction during TEOS polishing of around 10 less than the average of the GST2201 control composition, and about 15 less that the GST2201 average for polishing GST. The lowered coefficient of friction reduces surface defects that can occur during polishing.

Example 3

This example illustrates the performance of selected CMP compositions of the present invention (Compositions 1, 7 and 8 of Example 1) for removal of GST from an antimony rich GST substrate and silicon nitride. Composition 1 provided a 1500 Å/min GST removal rate, while Composition 7 provided a 682 Å/min removal rate, and Composition 8 provided a 150 Å/min removal rate. In addition, Composition 7 provided a 215 Å/min silicon nitride removal rate, and Composition 8 provided a 207 Å/min silicon nitride removal rate when used to polish silicon nitride blanket wafers. Consequently, these compositions can be utilized to remove GST and silicon nitride in substrates containing both materials. For comparison, Compositions 7 and 8 provided a silicon oxide (PETEOS) removal rate of about 10 Å/min.

This example was performed using the same conditions as Example 2: an Applied Materials REFLEXION LK CMP device with an IC1010 polishing pad, platen speed of about 93 rpm, head speed of about 91 rpm, down pressure of about 1.0 psi, and a slurry flow rate of about 300 mL/minute.

Example 4

A ceria abrasive can be used in place of colloidal silica in the compositions of the present invention. A non-limiting example of such a ceria-based composition contains ceria, 0.15 wt % of wet-processed ceria, 500 ppm of ALCO 4773, 100 ppm of DEQUEST 2010, and 0.5 wt % of lysine, and a pH of between 4-5. These types of ceria-containing compositions can be used to polish GST from an antimony rich GST substrate, as well as silicon nitride. Wet-processed ceria can remove silicon nitride provided that the pH is adjusted to about 4-5. Ceria generally provides poor removal of silicon nitride at pH of 3.5 or below. The ceria-containing slurry described above would have a positive Zeta potential, which would allow for the inclusion of a cationic polymer such as ALCO 4773 for defect control.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An aqueous chemical-mechanical polishing (CMP) composition for polishing germanium-antimony-tellurium (GST) alloys, the composition comprising an aqueous carrier containing:
   (a) a particulate abrasive selected from the group consisting of a colloidal silica abrasive and ceria abrasive;
   (b) a water soluble surface active material;
   (c) an amino acid corrosion inhibitor; and
   (d) a complexing agent;
   wherein the surface active material is selected based on the zeta potential of the particulate abrasive, such that when the abrasive has a positive zeta potential, the surface active material comprises a cationic material, and when the particulate abrasive has a negative zeta potential, the surface active material comprises an anionic material, a nonionic material, or a combination thereof.

2. The CMP composition of claim 1 wherein the composition is substantially free of oxidizing agents.

3. The CMP composition of claim 1 wherein the amino acid corrosion inhibitor comprises lysine.

4. The CMP composition of claim 1 wherein the complexing agent comprises a phosphonic acid compound.

5. The CMP composition of claim 4 wherein the phosphonic acid comprises 1-hydroxyethylidene-1,1,-diphosphonic acid.

6. The CMP composition of claim 1 wherein the particulate abrasive comprises wet-processed ceria.

7. The CMP composition of claim 1 wherein the particulate abrasive comprises ceria and the composition has a pH in the range of about 4 to 5.

8. The CMP composition of claim 1 wherein the particulate abrasive comprises a colloidal silica, and the composition has a pH in the range of about 2 to 3.

9. The CMP composition of claim 1 wherein the particulate abrasive comprises an aminosilane surface-treated colloidal silica having a positive zeta potential.

10. The CMP composition of claim 1 wherein the particulate abrasive comprises ceria or an aminosilane surface-treated colloidal silica having a positive zeta potential, and the water soluble surface active material comprises a poly(methacryloyloxyethyl trimethylammonium)halide.

11. The CMP composition of claim 1 wherein the particulate abrasive comprises a colloidal silica having a negative zeta potential, and the water soluble surface active material comprises a poly(acrylic acid), a polyacrylamide, or a combination thereof.

12. The CMP composition of claim 1, wherein the particulate abrasive has an average particle size in the rage of about 10 to about 200 nm.

13. The CMP composition of claim 1, wherein the particulate abrasive is present in the composition at a concentration in the range of about 0.01 to about 10 percent by weight (wt %).

14. The CMP composition of claim 1, wherein the water soluble surface active material is present in the composition at a concentration in the range of about 10 to about 10,000 parts-per-million (ppm).

15. The CMP composition of claim 1, wherein the amino acid corrosion inhibitor is present in the composition at a concentration in the range of about 0.01 to about 2 wt %.

16. The CMP composition of claim 1, wherein the complexing agent is present in the composition at a concentration in the range of about 10 to about 10,000 ppm.

17. The CMP composition of claim 1 further comprising potassium sulfate.

18. An aqueous chemical-mechanical polishing (CMP) composition for polishing germanium-antimony-tellurium (GST) alloys, the composition comprising an aqueous carrier containing, at point-of-use:
   (a) about 0.01 to about 10 wt % of a particulate abrasive selected from the group consisting of a colloidal silica abrasive and ceria abrasive;
   (b) about 10 to about 10,000 ppm of a water soluble surface active material;
   (c) about 0.1 to about 2 wt % of an amino acid corrosion inhibitor; and
   (d) about 10 to about 10,000 ppm of a complexing agent;
   wherein the surface active material is selected based on the zeta potential of the particulate abrasive, such that when the abrasive has a positive zeta potential, the surface active material comprises a cationic material, and when the particulate abrasive has a negative zeta potential, the surface active material comprises an anionic material, a nonionic material, or a combination thereof.

19. The CMP composition of claim 18 wherein the particulate abrasive comprises ceria or an aminosilane surface-treated colloidal silica, and has a positive zeta potential, and the water soluble surface active material comprises a poly (methacryloyloxyethyl trimethylammonium)halide.

20. The CMP composition of claim 18 wherein the particulate abrasive comprises a colloidal silica having a negative zeta potential, and the water soluble surface active material comprises a poly(acrylic acid), a polyacrylamide, or a combination thereof.

21. The CMP composition of claim 20 further comprising potassium sulfate.

22. The CMP composition of claim 18 wherein the complexing agent comprises 1-hydroxyethylidene-1,1,-diphosphonic acid.

23. The CMP composition of claim 18 wherein the corrosion inhibitor comprises lysine.

24. A chemical-mechanical polishing (CMP) method for polishing germanium-antimony-tellurium (GST) alloy-containing substrate, the method comprising the steps of:
   (a) contacting a surface of the substrate with a polishing pad and an aqueous CMP composition of claim 1; and
   (b) causing relative motion between the polishing pad and the substrate while maintaining a portion of the CMP composition in contact with the surface between the pad and the substrate for a time period sufficient to abrade at least a portion of the germanium-antimony-tellurium alloy from the substrate.

* * * * *